Patented Dec. 16, 1941

2,266,313

UNITED STATES PATENT OFFICE 2,266,313

METHOD OF MAKING A FILTERING SUBSTANCE

Russell W. Ehlers and William J. Foster, Flint, Mich., assignors to General Motors Corporation, Detroit, Mich., a corporation of Delaware No Drawing. Application June 24, 1939, Serial No. 280,992

4 Claims. (Cl. 210—204)

This invention relates to oil filters and has particular reference to a binder or bonding material to hold together a filtering material such as nodulated mineral wool.

It is known to use a cold water paste, such as potato or wheat starch, as a binder for filtering materials and casein also has been used. These binders of the prior art have advantages but are objectionable from some standpoints. For example, casein has a tendency to migrate to the surface of the filtering material when the material is being dried or baked to drive off excess moisture and this migration is the cause of the tendency to form a "case hardened" surface which is difficultly pervious to oil.

To obviate the difficulties with existing binders, experiments were made with many substances including phenolic resins, and in connection with resins there are in general two types: thermo-setting resins and thermo-plastic resins. The resin which is used for the binder of the present invention is the thermo-setting type and not the thermo-plastic type.

Thermo-setting phenolic resin is miscible with alcohol, in all proportions in the "A" stage, but insoluble in all ordinary solvents in the "C" stage; i. e., after being set by heat. As the undiluted resins are too viscous and sticky to be properly handled as a spray or with a spray gun, they must be thinned or diluted with a suitable thinner, and alcohol serves as an effective medium for this purpose. After the resin and alcohol are mixed and sprayed on the mineral wool and intermixed therewith, the alcohol evaporates leaving the resin to act as a binder.

The objections to alcohol are: (1) it is expensive and (2) the fumes are inflammable making it dangerous to use. For these reasons its use is to be avoided where possible. To this end experiments have been made using water instead of alcohol as a thinner.

In the experiments we conducted we found that when a highly soluble resin mixed with a large amount of the diluent is used, trouble was caused by the resin migrating to the outer surface of the filter element when the filtering material wetted with this mixture was dried. That is, while the diluent was being driven off in the baking process, it carried the resin from the inside of the filtering unit to the outside, causing a dense, hard layer of material on the outer surface, and leaving the inside soft and weak due to lack of sufficient bonding material. In spots this hardened layer was impervious to oil and very seriously interfered with the efficiency of the filter by shutting off the flow at these points. For this reason, since it is necessary to use large amounts of water in molding, the highly water-soluble resins could not be used, and when using alcohol the amount of this substance had to be kept small because of cost and dangerous fumes.

The same problem of migration is present with the casein binder which is now being used as a bond or binder in connection with some filters. In the drying process the casein migrates to the outer surface forming a hard outer layer which tends to prevent the oil from entering the filter.

"A" stage thermo-setting phenolic resins, although soluble in alcohol in all proportions, are usually not very miscible with water. The resin which we prefer is readily miscible with water in about equal proportion by weight or in any proportion less than an equal weight of water.

This resin will not take up much more than an equal weight of water, and when a proportion of from 1½ to 2 parts of water to one of resin is reached, the mixture clouds and coagulates so that the resin is visibly distinguishable from the excess water.

The reason it is desirable to use water as a thinner or diluent is that it is cheaper than alcohol and avoids the dangerous alcohol fumes. The alcohol is about as expensive as the resin, and water is therefore desirable because of the decrease in cost. Experience has shown that by the use of a mixture of one-to-one water and resin, the resin may be effectively sprayed from a nozzle and properly distributed on the mineral wool; and by using a resin with not much over a one to one water-resin miscibility the resin does not migrate to the surface to an objectionable extent.

The ingredients for making filter elements are mixed in about the following proportions:

| | Grams |
|---|---|
| Thermo-setting resin | 50 |
| Mixed with alcohol | 62½ |
| Nodulated mineral wool | 500 |

The above may be modified by mixing with the resin about 50 grams of water instead of the alcohol. The mixture of resin and alcohol, or resin and water, is a clear liquid and the alcohol or water is used only to make the liquid less viscous in order that it may be sprayed more effectively on the wool. The mineral wool may be previously wet with about 300 or more grams of water, or if desired the mixture of resin and alcohol, or resin and water, may be sprayed on the dry wool and 300 or more grams of water added subsequently. This extra water is necessary for molding the filtering material after it has been mixed with the binder.

In mixing the wool, resin and water, we prefer to use a mixer similar to a commercial bread mixer, which consists of a rotating pot containing a stationary plow. The mixer pot revolves and the plow causes the wool to be turned over and over as the pot rotates. The wool and water are mixed for one or two minutes which distributes the water thoroughly through the wool. Then while the pot is still turning the resin mixture is added with a spray gun. After the resin and wool are thoroughly commingled the wool is removed and definite quantities thereof are given a definite shape by moulding and the moulded mass then dried by the application of heat, leaving a relatively hard porous mass permeable to oil.

The advantages of the resin binder are that it has little tendency to shrink in drying, it does not migrate appreciably and is unaffected by oil, water or any ordinary solvent.

In using phenolic resin it has been found that a resin which will mix with very much more than 100% water is not completely satisfactory as a binder because of migration. A resin miscible with 100% or less water is satisfactory, but if the water is miscible up to as high as 200% the resin binder is likely to be unsatisfactory. The sole reason for using a diluent is to make the resin less viscous so that it will be better atomized in the spraying apparatus and thus better distributed on the wool.

The resin used is a thermo-setting liquid phenolic resin, specifically, phenol and formaldehyde with or without some cresol. It is reacted with an alkaline catalyst.

The manner in which the filter is applied and used is shown and described in the United States patents Kamrath 2,079,910, McKinley 1,940,316, and Kamrath 2,203,495.

As the approximate proportions of a batch of the mixture of mineral wool, water, and resin as used in production, the following is given:

| | | |
|---|---|---|
| Water | lbs | 10 |
| Wool | lbs | 18 |
| 4½ lbs. of a one to one mixture of resin and water | cc | 2000 |

These proportions may be varied to some extent without adversely affecting the quality of the resulting product.

We claim:

1. The method of making a filtering substance comprising mixing nodulated mineral wool with a quantity of water sufficient to wet the wool, then spraying on the wool a mixture of water and resin, the wool being worked in a mixer while the resin is being sprayed thereon, then in shaping definite quantities of the mixed wool and resin, then in drying the shaped mass to drive off the water and excess liquid.

2. A method of making a filtering substance comprising placing a quantity of mineral wool in a rotatable mixer, spraying a resin on the wool while the mixer is operating, continuing the operation of the mixer until the wool and resin are thoroughly commingled, then removing the commingled mass and forming definite quantities thereof into a definite shape, then drying the shaped mass to drive off excess moisture and leaving a relatively hard porous mass pervious to oil.

3. The method of making a filtering substance comprising mixing a filtering material with a quantity of water sufficient to wet the material, then spraying on the material a mixture of water and resin, the material being worked in a mixer while the resin is being sprayed thereon, then in shaping definite quantities of the mixed material and resin, then in drying the shaped mass to drive off the excess liquid.

4. A method of making a filtering substance comprising placing a quantity of a filtering material in a mixer, spraying a resin on the material while the mixer is operating, continuing the operation of the mixer until the material and resin are thoroughly commingled, then removing the commingled mass and forming definite quantities thereof into a definite shape, then drying the shaped mass to drive off excess liquid and leaving a relatively hard porous mass pervious to oil.

RUSSELL W. EHLERS.
WILLIAM J. FOSTER.